United States Patent [19]

Scheuneman et al.

[11] 4,163,147
[45] Jul. 31, 1979

[54] DOUBLE BIT ERROR CORRECTION USING DOUBLE BIT COMPLEMENTING

[75] Inventors: James H. Scheuneman, St. Paul; John R. Trost, Anoka, both of Minn.

[73] Assignee: Sperry Rand Corporation, New York, N.Y.

[21] Appl. No.: 871,048

[22] Filed: Jan. 20, 1978

[51] Int. Cl.² .......................................... G06F 11/12
[52] U.S. Cl. ................................................ 235/312
[58] Field of Search ........................ 235/312, 303.2; 340/146.1 BA

[56] References Cited

U.S. PATENT DOCUMENTS

| | | |
|---|---|---|
| 3,449,718 | 6/1969 | Woo ........................... 340/146.1 BA |
| 3,582,880 | 6/1971 | Beausoleil et al. ......... 340/146.1 BA |
| 3,755,779 | 8/1973 | Price ................................. 235/312 X |
| 3,949,208 | 4/1976 | Carter .............................. 235/312 X |
| 4,030,067 | 6/1977 | Howell et al. .................. 235/312 X |
| 4,077,028 | 2/1978 | Lui et al. ......................... 235/312 X |

*Primary Examiner*—David H. Malzahn
*Attorney, Agent, or Firm*—John L. Rooney; Kenneth T. Grace; Marshall M. Truex

[57] ABSTRACT

An improvement to a semiconductor memory subsystem containing single bit error correction/double bit error detection (SBC/DBD) which provides correction of double bit errors through the utilization of a modest amount of additional circuitry. The present invention accomplishes this result through the technique of sequentially complementing each double bit pair within the semiconductor memory subsystem data word determined to contain a multiple error and rechecking the modified data word with the existing SBC/DBD circuitry, one double bit pair at a time, until it is determined by the SBC/DBD circuitry that such double bit pair complementing has corrected the double bit error.

4 Claims, 5 Drawing Figures

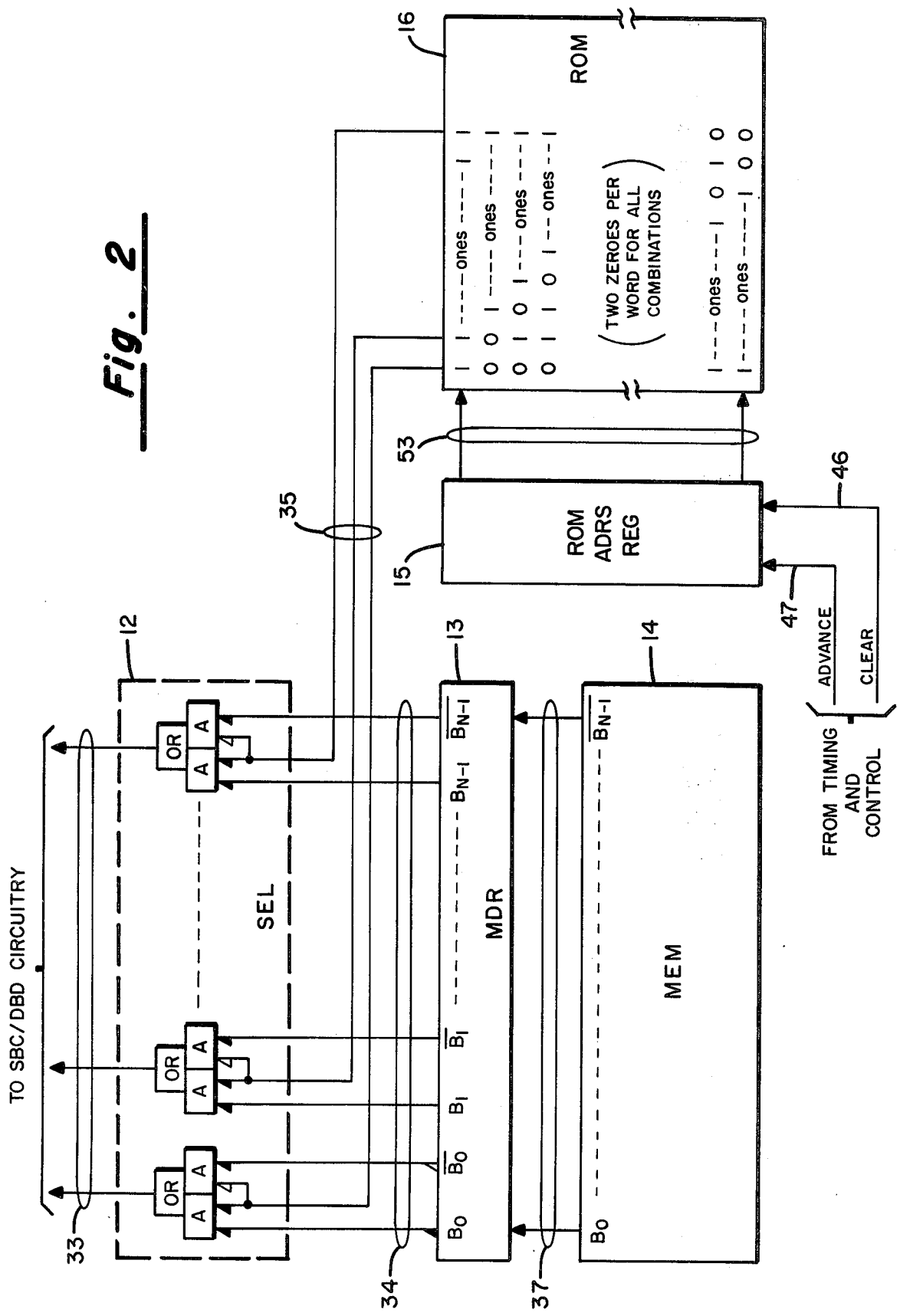

DOUBLE BIT ERROR CORRECTION USING DOUBLE BIT COMPLEMENTING

BACKGROUND OF THE INVENTION

This invention relates to data processing systems and more particularly to the use of semiconductor memory subsystems employing single bit error correction/double bit error detection (SBC/DBD).

Semiconductor memory subsystems using large scale integrated circuit (LSI) techniques have proven to be cost-effective for certain applications of storing digital information. Most semiconductor memory subsystems are comprised of a plurality of similar memory storage devices or bit planes each of which is organized to contain as many memory storage cells or bits as feasible in order to reduce per bit costs and to also contain addressing and read and write circuits in order to minimize the number of connections to each memory storage device. In many designs, this has resulted in an optimum memory storage device or bit plane that is organized as $2^W$ words of one bit each, typically 256, 1024 or 4096. Certain contemporary technologies produce memory storage devices of $2^{14}$ or more bits. Because of the one bit organization of the memory storage device, single bit error correction as described by Hamming in the publication "Error Detecting and Correcting Codes", R. W. Hamming, The Bell System Journal, Volume XXIX, April 1950, No. 2, pp. 147–160, has proven quite effective in correcting the error of a single memory storage device or bit in a given word, i.e., a single bit error, the word being of a size equal to the word capacity of the semiconductor memory subsystem, without causing loss of data readout from the semiconductor memory subsystem.

Because the memory storage devices are quite complex, and because many are used in a semiconductor memory subsystem, they usually represent the predominate component failure in a semiconductor memory subsystem. Consequently, it is common practice to employ some form of single bit error correction along the line described in Hamming. While single bit error correction allows for tolerance of single bit memory storage cell failure, as more malfunctions occur, the statistical chance of finding two of them, i.e., a double bit error, in the same word increases. While the method to accomplish double bit error correction as suggested by Hamming has been known in the art for some time, the cost of the additional circuitry required has made the technique economically unfeasible for most commercial applications. Recent work in the art has taught methods for the logging of errors for scheduling maintenance before the occurrence of a double bit error as disclosed by Petschauer in U.S. Pat. No. 3,999,051.

The present invention addresses the double bit error problem by providing a technique for correcting double bit errors by improvements to the existing SBC/DBD technology.

SUMMARY OF THE INVENTION

The present invention utilizes a read-only-memory device (ROM) which contains each combination of two bits to be complemented within the data word to be accessed from the semiconductor memory subsystem. The error status of each data word accessed from the semiconductor memory subsystem is communicated to the memory subsystem timing and control circuitry which inhibits transfer of any data word to the semiconductor memory subsystem interface register containing an uncorrected multiple bit error. This causes the double bit patterns stored within the ROM to sequentially complement, within the accessed data word, each combination of two bits. When the two bits of the accessed data word are complemented which are actually in error, the SBC/DBD circuitry notifies the invention's timing and control circuitry that the accessed data word is now correct or correctable and the timing and control circuitry enable the corrected accessed data word to the semiconductor memory subsystem interface register for immediate utilization within the data processing system.

In this manner, each data word accessed from the semiconductor memory subsystem is automatically corrected for multiple bit errors.

BRIEF DESCRIPTION OF THE DRAWINGS

FIG. 2 provides a detailed illustration of the present invention.

DESCRIPTION OF THE PREFERRED EMBODIMENT

Figure 1:
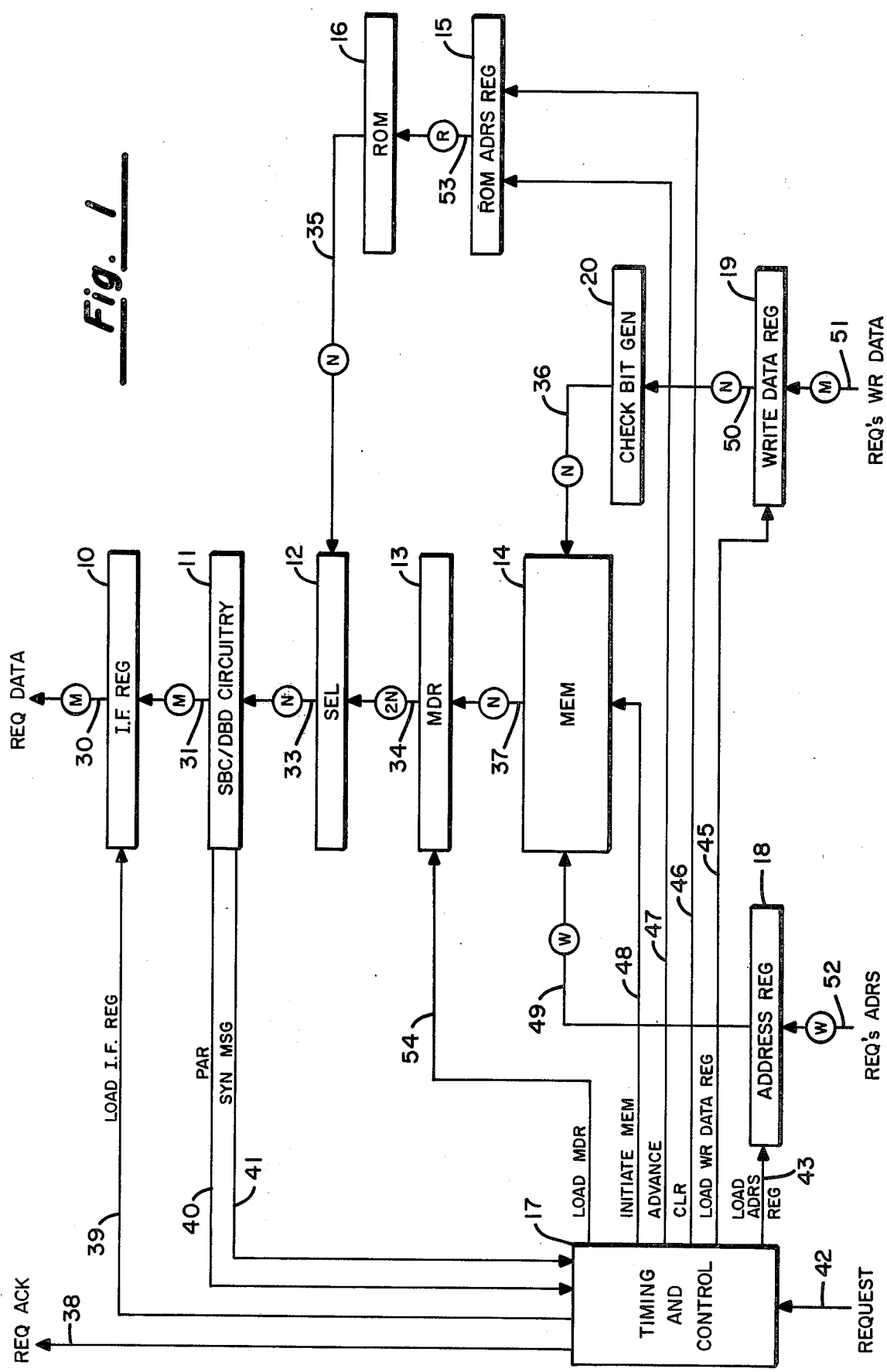
FIG. 1 illustrates the improved semiconductor memory subsystem.

FIG. 1 illustrates a semiconductor memory subsystem utilizing the present invention. The basic word width of the semiconductor memory subsystem (i.e., the number of bits per accessed data word) is M. This requires the capacity within the memory storage bank, MEM 14, of a word of width N containing the M data bits plus the coding or check bits (see Hamming) to provide the SBC/DBD capability. Each data word (of M bits) is written into MEM 14 as an N bit word containing the M data bits and N-M bits of coding to perform the SBC/DBD. The $2^W$ total memory storage cells or addressable locations of (of M data bits plus N-M coding bits) may be referenced by an address word of W bits. The read only memory, ROM 16, as required by the present invention contains $2^R$ cells of N bits. Each of the $2^R$ cells of N bits within ROM 16 may be uniquely addressed by a ROM address word of R bits. For the purpose of further discussion, the values of M, N, R and W will be referenced as logical quantities. However, if M represents a data word of 38 bits, for example, six check bits are required for SBC (see Hamming) and one parity bit is required from DBD. In general, the relationship between the data word width M and the coded data word width N providing SBC/DBD is $N = M + 1 + \boxed{\log_2 M}$ where $\boxed{\log_2 M}$ is the integer $|\log_2 M|$ if M is an even power of two and where $\boxed{\log_2 M}$ is the integer $|\log_2 M| + 1$ if M is not an even power of two. In general $$2^R = \frac{N!}{(N-2)!2!} + 1.$$

In the case where M is 38, N is 45 and $2^R$ is 991. Since R must be an integer, R=10 and the actual ROM addressing capacity becomes $2^R = 1024$ even though ROM 16 need contain only 991 storage cells. The value of W is determined solely by the capacity (i.e., number of storage cells) of MEM 14. As explained before, it is defined as W wherein the capacity of the semiconductor memory subsystem is $2^W$ storage cells.

To provide SBC/DBD, N-M coding bits are required as explained above. For the case wherein N=45 and M=38, 7 bits (N-M) are required. As also explained above, this includes the six bits required for SBC (see Hamming) and a parity bit to distinguish between one and two failures. The six bit (N-M-1 in general) SBC code is known as the syndrome message. If no errors are present, the symdrome message is zero. If an error is present, the syndrome message does not equal zero. The parity bit will provide odd parity when no or an even number of errors is present. Even parity will be found if an odd number of errors is present. Therefore, the possible error conditions may be described by Table A.

TABLE A

| Syndrome Message | Parity | Errors |
| --- | --- | --- |
| = 0 | odd | none |
| ≠ 0 | even | 1(3, 5, etc.) |
| ≠ 0 | odd | 2(4, 6, etc.) |

Referring to FIG. 1, the data processing system activates the request line 42 to write data into the semiconductor memory subsystem. It also provides a requested address word of W-bits on line 52 and the M-bit requested write data word on line 51. The semiconductor memory subsystem timing and control circuitry 17 initiates access to MEM 14 via line 48. The requested address, as received via line 52, is enabled into Address Register 18 by timing and control 17 via line 43 and presented to MEM 14 as a W-bit address word via line 49. The requested write data received as an M-bit word via line 51 is enabled by timing and control 17, via line 45, into Write Data Register 19. Line 50 supplies this M-bit requested write data word to Check Bit Generator 20 which computes the N-M coding bits and parity required for SBC/DBD and appends these to the M-bit requested write data word to form an N-bit word. This N-bit word is transferred to MEM 14 for storage via line 36.

Should the data processing system desire to read the data word previously stored within MEM 14, it transfers and access request to timing and control 17 via line 42 and the W-bit requested address to Address Register 18 via line 52. Timing and Control 17 enables the W-bit requested address into Address Register 18 via line 43 and initiates reference to MEM 14 via line 48. The N-bit contents of the storage cell within MEM 14 as selected by the W-bit address in Address Register 18 is transferred to the memory data register, MDR 13, via line 37. Timing and control 17 enables that N-bit word into MDR 13 via line 54. The accessed word is transferred to the correction selector, SEL 12, via line 34. The same N-bit quantity is transferred to the SBC/DBD circuitry 11 via line 33.

If the N-M coding bits indicate that no errors are present, SBC/DBD circuitry 11 merely removes the N-M coding bits and transfers the M-bit accessed data word to the Interface Register, I.F. Reg 10. Timing and control 17 enables the M-bit accessed data word into I.F. Reg 10 via line 39. Timing and Control 17 notifies the data processing system via line 38 that the M-bit accessed data word is available to it via line 30.

If the N-M coding bits indicate that a single bit error is present, SBC/DBD circuitry 11 corrects the single bit error and removes the N-M coding bits. The M-bit accessed data word is then made available to the data processing system as explained above.

Figure 3A:
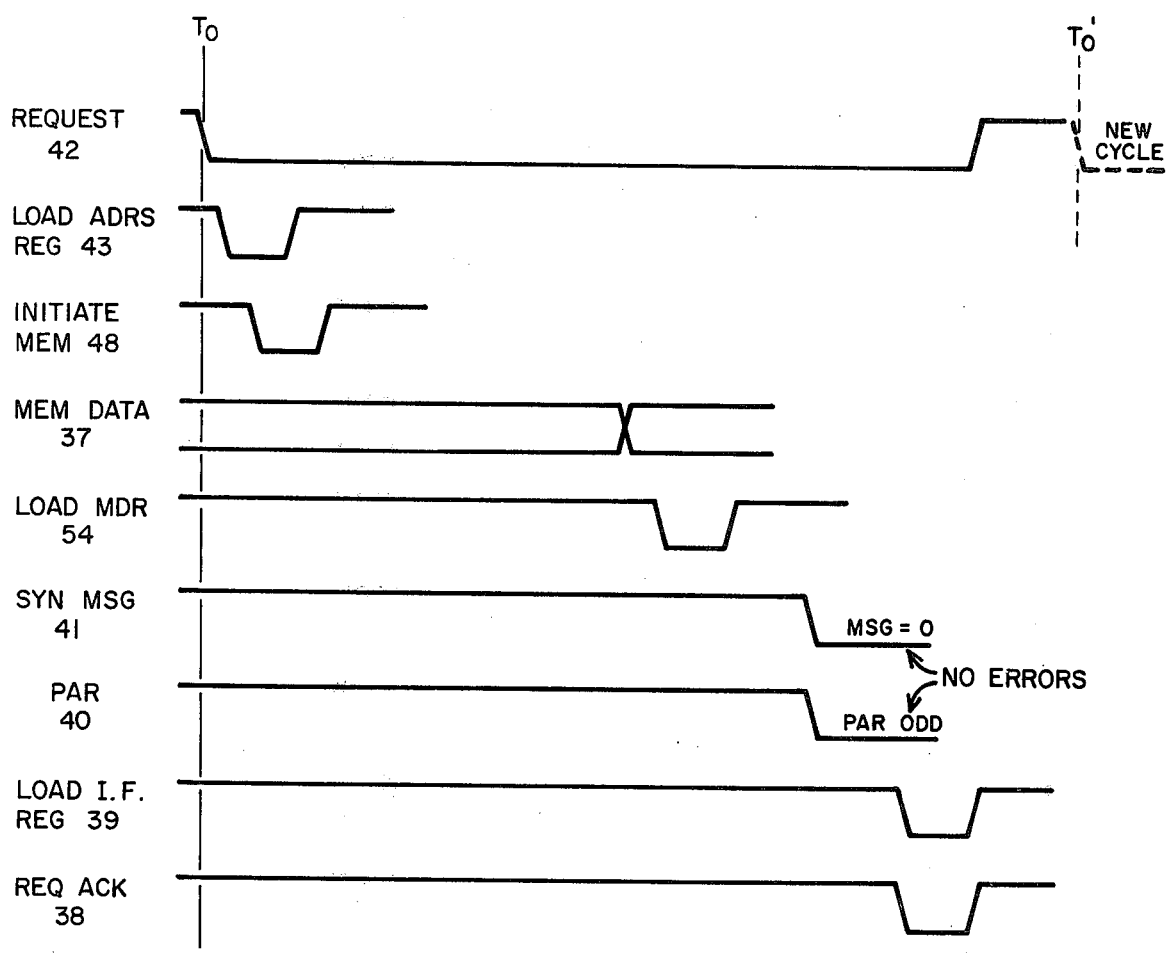
FIG. 3a illustrates the timing sequence of a data word access cycle within the improved semiconductor memory subsystem when no errors are deteced.
Figure 3B:
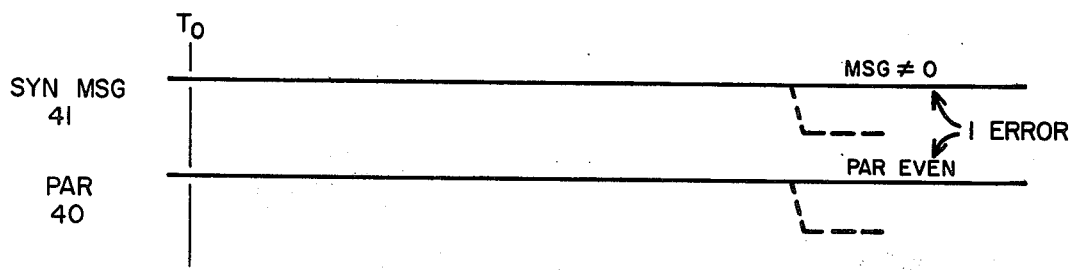
FIG. 3b illustrates the change of signals on lines 40 and 41 as a result of a single bit error.

FIG. 3a shows the timing of the read access operation wherein no errors are found by SBC/DBD circuitry 11. FIG. 3b illustrates the change to lines 40 and 41 resulting from a single error condition. Since lines 40 and 41 inform control and timing 17 of a condition correctable by SBC/DBD circuitry 11, the timing of the load interface register signal, transferred via line 39, and the Request Acknowledge signal, transferred via line 38, remain the same as in the no error case. Therefore, the timing of the data word access with no errors and with one error are identical except that in the latter case, lines 40 and 41 notify timing and control 17 of the single bit error condition.

Figure 4:
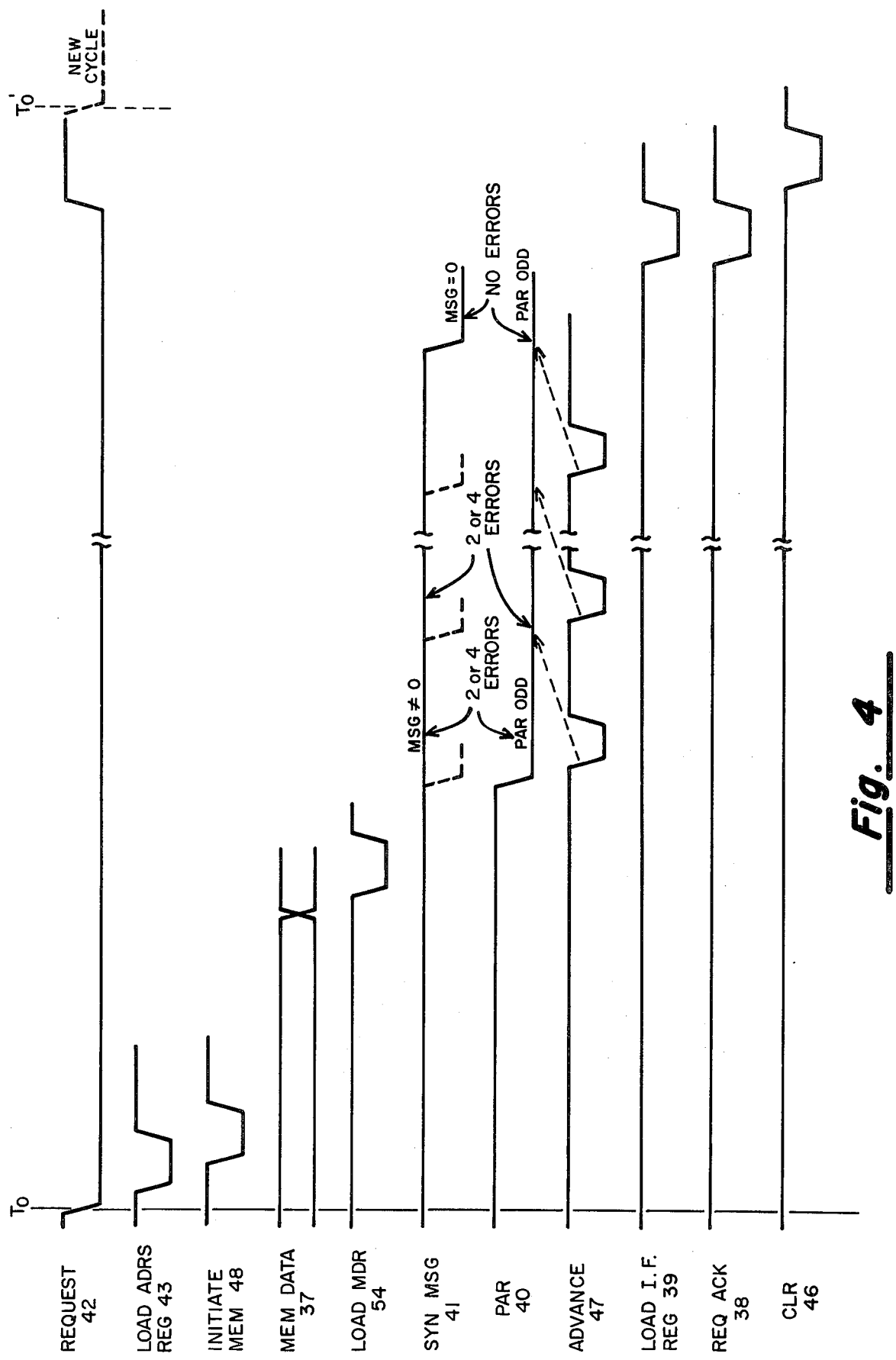
FIG. 4 illustrates the timing sequence of a data word access cycle within the improved semiconductor memory subsystem when a double bit error is corrected.

The previous discussion detailing the operation of a semiconductor memory subsystem employing SBC/DBD under conditions of no errors or one error is well known in the art. This material was presented by way of definition only. Should SBC/DBD circuitry 11 detect a double bit error, however, the present invention is employed. As shown in Table A, a double bit error will produce a non-zero syndrome message with odd parity. Referring to FIG. 1, SBC/DBD circuitry 11 notifies timing and control 17 of these conditions via lines 40 and 41. As shown in FIG. 4 the non-zero syndrome message is transferred via line 41 and the odd parity condition is transferred via line 40. At this point, the timing of the data read access becomes different from the situation wherein no errors or only one are found. Upon being notified of a non-zero syndrome message via line 41 and odd parity via line 40, timing and control 17 inhibits transfer of the load interface register signal via line 39. As illustrated in FIG. 4, this signal will be inhibited until such time as SBC/DBD circuitry 11 notifies timing and control 17 of odd parity via line 40 and a zero syndrome message via line 40 indicating a no error condition.

During the time wherein the load interface register signal is inhibited from line 39, a series of advance signal pulses are transmitted via line 47. See FIG. 4. These advance signal pulses are used to increment ROM Address Register 15 via line 47. As illustrated in FIG. 2 ROM Address Register 15 supplies ROM 16 with an address word of R bits via line 53 which uniquely addresses one of the $2^R$ cells within ROM 16. As stated above, each advance signal pulse received by ROM Address Register 15 causes the address stored therein to be incremented by one. This incrementation is the addition of a binary one (1) to the address stored within ROM Address Register 15. Therefore, the address presented to ROM 16 via line 53 is increased by one with each additional advance signal pulse. This causes ROM Address Register 15 to address the next sequential storage cell of ROM 16 with each additional advance signal pulse. The contents of each sequentially addressed storage cell of ROM 16 are transferred to SEL 12 via line 35. Each sequentially addressed storage cell of ROM 16 contains N bit positions arranged as shown in FIG. 2. As shown, the first storage cell contains all ones, the second storage cell contains zeroes only in the first two bit positions, and each succeeding storage cell contains only two zeroes arranged in a different combination of bit positions. Therefore, ROM 16 contains all combinations of zeroes taken two at a time for an N-bit word within its $2^R$ storage cells.

The interface between MDR 13 and SEL 12 via line 34 is called "double gated". Double-gating is a technique well known in the art wherein both sides of a flip-flop are transferred in a register-to-register transfer. Its principle advantage is speed in that a clear signal is not required to set each flip-flop of the receiving register to a known state before gating the data from the first register to the second.

The complementing of each pair of bit positions in the accessed read data word is accomplished by SEL 12. As shown in FIG. 2, each bit position from MDR 13 is double-gated through SEL 12 by the contents of the sequentially accessed storage cells of ROM 16. For each bit position of MDR 13, the content and $\overline{\text{content}}$ of the corresponding flip-flop of MDR 13 are transferred to SEL 12 via line 34 and "anded" with the content of that same bit position of ROM 16 from the one of $2^R$ storage cells addressed by ROM Address Register 15. If the content and $\overline{\text{content}}$ of a flip-flop of MDR 13 are anded by SEL 12 with a one from ROM 16, the state of that bit position is transferred from SEL 12 to SBC/DBD circuitry 11 via line 33 in the same state as in MDR 13. If the content of a flip-flop of MDR 13 is anded with a zero from ROM 16, it is transferred from SEL 12 to SBC/DBD circuitry 11 in the opposite (i.e., $0 \rightarrow 1, 1 \rightarrow 0$) state as in MDR 13. The transfer of an opposite state is called complementing. Because the advance signal pulse causes each sequential storage cell of ROM 16 to be addressed and because the $2^R$ cells of ROM 16 contain all combinations of zeroes taken two at a time within an N-bit word, $2^R$ advance signal pulses sent from timing and control 17 via line 47 will cause SEL 12 to sequentially complement all combinations of bit positions taken two at a time of the N-bit data word being transferred from MDR 13 to SBC/DBD circuitry 11.

Therefore, SBC/DBD circuitry 11 will initially receive the accessed data word with a double bit error and will sequentially have all combinations of the N-bit word complemented taking two bit positions at a time. See FIG. 1. SBC/DBD circuitry 11 will continue to determine the syndrome message and parity of the accessed data word with each combination of two bits complemented. At such time as the two bit positions actually in error have been complemented by SEL 12, SBC/DBD circuitry 11 will observe that the syndrome message is zero and the parity is odd and notify timing and control 17 of this condition via lines 41 and 40, respectively. Timing and control 17 will send Load Interface Register signal via line 39 and Interface Register 10 will receive the accessed read data word via line 31 as an M-bit word since SBC/DBD circuitry 11 will have removed the N-M coding bits. Timing and control 17 will notify the data processing system that the accessed read data word is available by transmitting a request ackowledge signal via line 38. To reset the ROM Address Register 15 to zero, timing and control 17 transmits a clear signal via line 46. This will cause ROM Address Register 15 to address storage cell zero of ROM 16 via line 53. As stated above, storage cell zero contains all ones which are transferred to SEL 12 via line 35. In this manner, the next N-bit word accessed from MEM 14 will be transferred from MDR 13 to SBC/DBD circuitry 11 through SEL 12 with no bits complemented until such time as timing and control 17 transmits advance signal pulses via line 47 to increment ROM Address Register 15.

FIG. 4 provides the timing of the semiconductor memory subsystem wherein SBC/DBD circuitry 11 initially detects a two bit error. Notice that the load interface register signal transferred via line 39, the request acknowledge signal transferred via line 38, and the clear signal transferred via line 46 are delayed for some multiple of the cycle time of the advance signal pulse transferred via line 47. That multiple is between one and R and corresponds to the number of combinations of two bit positions which must be complemented before SBC/DBD circuitry 11 determines that an error no longer exists.

By this technique the present invention automatically corrects double bit errors within the semiconductor memory subsystem.

What is claimed is:

1. In a semiconductor memory subsystem containing single bit error correction/double bit error detection circuitry, SBC/DBD, requiring N-M coding bits for M data bits and a memory storage bank having a plurality of addressable locations, each permitting storage of an N-bit word comprised of an M-bit data word and N-M coding bits, permitting access to one of said M-bit data words upon request and transferring said M-bit accessed data word to the requestaing apparatus, the improved method for correcting double bit errors comprising:

sensing the presence of a double bit error within said N-bit word containing said M-bit accessed data word;

inhibiting the transfer to said requesting apparatus of said M-bit accessed data word when said N-bit word contains said double bit error;

complementing two of the bit positions of said N-bit word thereby creating a modified N-bit word;

testing said modified N-bit word for the absence of said double bit error;

enabling said transfer to said requesting apparatus of said modified M-bit accessed data word if and only if said testing indicates said absence of said double bit error;

complementing a different combination of two of said bit positions of said N-bit word thereby creating a different modified N-bit word;

testing said different modified N-bit word for said absence of said double bit error;

enabling said transfer to said requesting apparatus of said different modified M-bit accessed data word if and only if said testing indicates said absence of said double bit error;

repeating sequentially the previous three steps until said different M-bit modified accessed data word has been transferred to said requesting apparatus.

2. In a semiconductor memory subsystem according to claim 1, said method for complementing a different combination of two of said bit positions of said N-bit word comprising:

storing a binary code representing each of said different combinations of two bit positions of said N-bit word within a read only memory (ROM);

selecting said binary code representing one of said different combinations of two bit positions of said N-bit word from said read only memory; and complementing two bit positions of said N-bit word corresponding to said binary code representing one of said different combinations of two bit positions of said N-bit word containing said M-bit accessed data word.

3. In a semiconductor memory subsystem containing single bit error correction/double bit error detection circuitry, SBC/DBD, and a memory storage bank having a plurality of addressable locations of N bit data words, permitting access to a data word upon request and transferring said accessed data word to the requesting apparatus, the improvement comprising:

inhibiting means responsively coupled to said single bit error correction/double bit error detection circuitry for inhibiting said transfer to said requesting apparatus of said accessed data word if said accessed data word contains a double bit error;

complementing means responsively coupled to said memory storage bank and said single bit error correction/double bit error detection circuitry for sequentially complementing each different combination of two bit positions of said N-bit word containing said double bit error thereby creating corresponding modified accessed data words; and enabling means responsively coupled to said memory storage bank, said single bit error correction/double bit error detection circuitry and said complementing means for enabling said transfer to said requesting apparatus of a one of said corresponding modified accessed data words whose two bit positions causing said double bit error have been complemented by said complementing means.

4. In a semiconductor memory subsystem according to claim 3, said complementing means comprising:

selector means responsively coupled to said memory storage bank and said single bit error correction/double bit error detection circuitry for selectively complementing certain bit positions of said accessed data word being transferred from said memory storage bank to said single bit error correction/double bit error detection circuitry;

read-only memory responsively coupled to said selector means and containing all possible combinations of two bit positions within said accessed data word for defining which bit positions of said accessed data word should be complemented by said selector means;

read-only memory addressing means responsively coupled to said read-only memory for addressing one of all possible combinations of two bit positions within said accessed data word contained within said read-only memory; and timing and control means responsively coupled to said single bit error correction/double bit error detection circuitry and said read-only memory addressing means for incrementing said read-only memory addressing means until said single bit error correction/double bit error detection circuitry indicates that said double bit error has been corrected.

* * * * *